J. BENNOR.
Extension Tables for Sewing-Machines.
No. 5,667. Reissued Nov. 25, 1873.
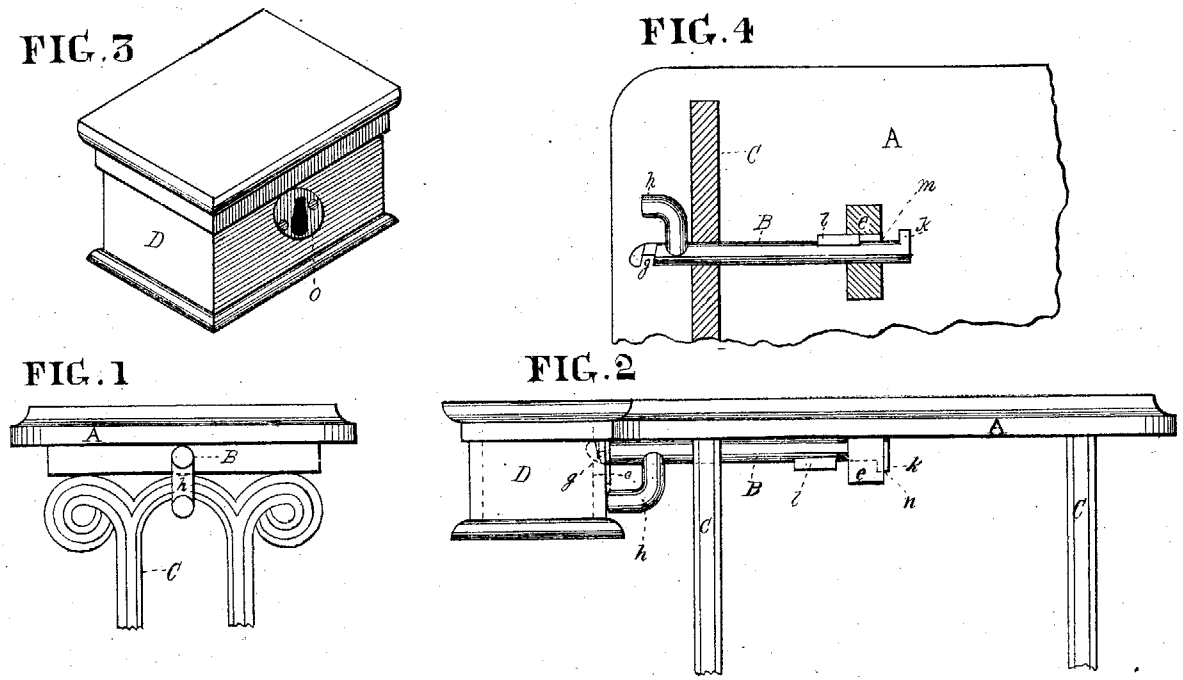
Witnesses
Thomas J. Beuley.
Stephen Ustick
Inventor
Joseph Bennor
AM. PHOTO-LITHOGRAPHIC Co. N.Y. (OSBORNE'S PROCESS.)

UNITED STATES PATENT OFFICE.

JOSEPH BENNOR, OF PHILADELPHIA, PA., ASSIGNOR, BY MESNE ASSIGNMENTS, TO NESBIT D. STOOPS AND JOHN B. MYERS, OF SAME PLACE.

IMPROVEMENT IN EXTENSION-TABLES FOR SEWING-MACHINES.

Specification forming part of Letters Patent No. 136,959, dated March 18, 1873; reissue No. 5,667, dated November 25, 1873; application filed September 30, 1873.

*To all whom it may concern:*

Be it known that I, JOSEPH BENNOR, of the city of Philadelphia and State of Pennsylvania, have invented certain Improvements in Extension-Tables for Sewing-Machines, of which the following is a specification:

My invention relates to a turning and sliding rod or bracket, having an arm in connection therewith, so constructed and arranged, in relation to the table-top, as to admit of being pushed beneath the same, out of the way and out of sight, when not in use, and of being drawn forward and turned partly around, to receive and hold the cover in connection with the table-top as an extension thereof, as hereinafter fully described.

Figure 1 is an end view of a sewing-machine table provided with the turning and sliding rod B, having an arm, *h*. Fig. 2 is a side elevation of the same with the cover D attached to one end. Fig. 3 is an isometrical view of the cover D. Fig. 4 is a reverse plan view of the table-top A, having the rod B in connection therewith.

Like letters of reference in all the figures indicate the same parts.

A represents the top of the table of a sewing-machine, and B a turning and sliding rod arranged beneath it. C C are the end frames, which support the top A. D is the cover, which is supported, when used as an extension of the table, by means of the rod B and arm *h* projecting therefrom, as seen in Fig. 2. The rod is supported at its front end in a notch in the upper end of one of the frames C. The other end is supported in the block *e*, which is fastened to the lower side of the top A. The rod has on its outer end a hook, *g*, for connecting it with the eye-plate *o* in one side of the cover D, the arm *h* bracing the same in its level position with the top A. It is provided at its inner end with two lugs, *k* and *l*, situated at opposite sides of the block *e*, which has notches *m* and *n*, which alternately receive the lugs to lock the rod in its adjusted position. The lug *k* engages with the notch *n* when the rod is drawn forward and swung down into connection with the cover, as seen in Fig. 2, the notch holding the rod to keep it from turning, and also to prevent its being drawn farther forward. The lug *l* engages with the notch *m* when the bracket is pushed back under the top A, as seen in Fig. 4. Around the edge of the top of the cover is a molding, *b*, which rests in a corresponding molding, *b'*, of the top A of the table, as shown in Fig. 2, to support the cover at this edge level with the top of the table.

When the extension of the cover is no longer required, it is unhooked from its connection with the table-top, and placed thereon to cover the sewing-machine, and the bracket is swung one-fourth around, so as to bring the brace *h* horizontal with the rod B. It is then pushed back, out of the way and out of sight, under the top A of the table, until the lug *l* engages with the notch *m*, as shown in the reverse plan view, Fig. 4, whereby it is held securely in this position until it is again drawn forward and swung partly around, as seen in Fig. 2, to receive the cover.

I claim as my invention—

1. The turning and sliding rod B, provided at its front end with the hook *g*, and at its rear end with the lugs *l* and *k*, in combination with the block *e*, having notches *m* and *n*, and with the eye-plate *o* of the cover, for holding it in connection with the top A, substantially in the manner and for the purpose above described.

2. The rod or bracket B, having a hook, *g*, and arm *h*, in combination with a sewing-machine table and cover, D, substantially as described.

JOSEPH BENNOR.

Witnesses:

THOMAS J. BEWLEY,
STEPHEN USTICK.